United States Patent
Thurner et al.

(10) Patent No.: US 9,188,366 B2
(45) Date of Patent: Nov. 17, 2015

(54) ERECTION SYSTEM FOR SOLAR PANELS

(71) Applicant: Krinner Innovation GmbH, Strasskirchen (DE)

(72) Inventors: Günther Thurner, Strasskirchen (DE); Martin Thurner, Strasskirchen (DE)

(73) Assignee: Krinner Innovation GmbH, Strasskirchen (DE)

( * ) Notice: Subject to any disclaimer, the term of this patent is extended or adjusted under 35 U.S.C. 154(b) by 266 days.

(21) Appl. No.: 13/907,255

(22) Filed: May 31, 2013

(65) Prior Publication Data

US 2013/0334152 A1    Dec. 19, 2013

(30) Foreign Application Priority Data

Jun. 1, 2012    (DE) .................... 20 2012 005 413 U
Sep. 4, 2012    (DE) .................... 20 2012 008 443 U

(51) Int. Cl.
 F24J 2/52    (2006.01)
 F24J 2/54    (2006.01)
 F24J 2/46    (2006.01)

(52) U.S. Cl.
 CPC ............... F24J 2/5245 (2013.01); F24J 2/526 (2013.01); F24J 2/5232 (2013.01); *F24J 2002/4663* (2013.01); *F24J 2002/522* (2013.01); *Y02E 10/47* (2013.01)

(58) Field of Classification Search
 CPC ....... F24J 2/5232; F24J 2/5233; F24J 2/5245; F24J 2/526; F24J 2002/4663; F24J 2002/5215; F24J 2002/5218; F24J 2002/5222; H01L 31/0422

USPC ......................................................... 211/41.1
See application file for complete search history.

(56) References Cited

U.S. PATENT DOCUMENTS

| | | | |
|---|---|---|---|
| 2012/0073563 A1* | 3/2012 | Zuritis .......................... | 126/569 |
| 2012/0090665 A1* | 4/2012 | Zuritis .......................... | 136/251 |
| 2013/0125959 A1* | 5/2013 | Sagayama et al. ............ | 136/251 |
| 2013/0139870 A1* | 6/2013 | Nuernberger et al. ........ | 136/251 |
| 2013/0256246 A1* | 10/2013 | Tagliamonte ................. | 211/41.1 |
| 2014/0112706 A1* | 4/2014 | Ma ................................. | 403/186 |

(Continued)

FOREIGN PATENT DOCUMENTS

| | | | | |
|---|---|---|---|---|
| DE | 102011017467 B3 * | 3/2012 | | |
| EP | 2109152 A2 * | 10/2009 | ............ | H01L 31/042 |
| WO | WO 2012167774 A2 * | 12/2012 | | |

*Primary Examiner* — Joshua Rodden
(74) *Attorney, Agent, or Firm* — Marshall, Gerstein & Borun LLP

(57) ABSTRACT

An erection system for the attachment of solar panels arranged areally adjacent one another and inclined toward the sun. The solar panels are held in rows by a multiplicity of holding members that are fastened to posts anchored in the ground by base members arranged substantially orthogonally with respect to the holding members and which have downwardly open U-profiles. The base members can be connected to the posts via mounting units. Each mounting unit has two clamping shells with semicircular recesses for abutment against the posts and substantially planar abutment surfaces for abutment against the side surfaces of the U-profile. Bores are arranged in the abutment surfaces of the clamping shells and corresponding bores are arranged in the side surfaces of the base member such that the base members can be fixed in a frictionally locking and/or positively locking manner to the posts by screw connections extending through the bores.

10 Claims, 8 Drawing Sheets

(56) References Cited

U.S. PATENT DOCUMENTS

| | | | |
|---|---|---|---|
| 2014/0252195 A1* | 9/2014 | Maresca | 248/371 |
| 2014/0305887 A1* | 10/2014 | Zuritis | 211/41.1 |
| 2015/0034575 A1* | 2/2015 | Warpup et al. | 211/41.1 |

\* cited by examiner

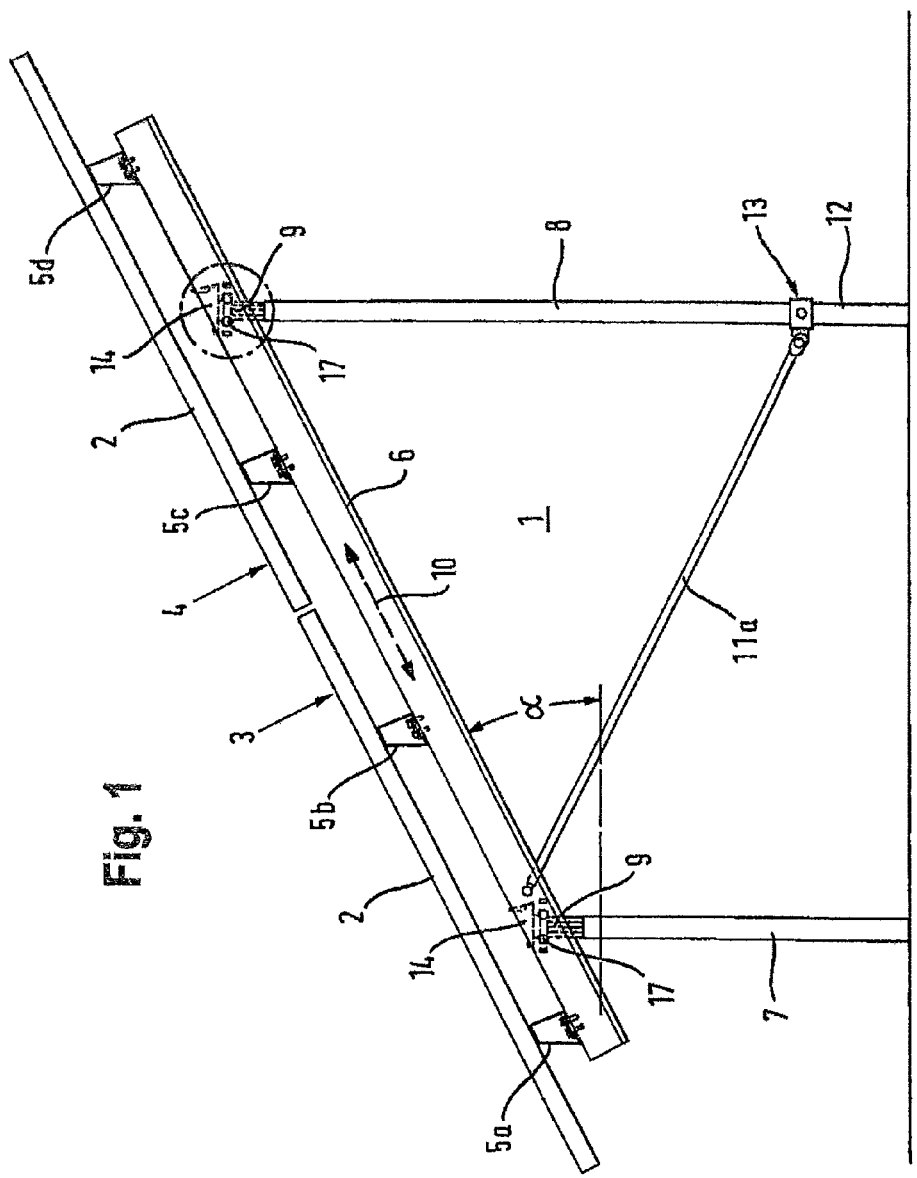

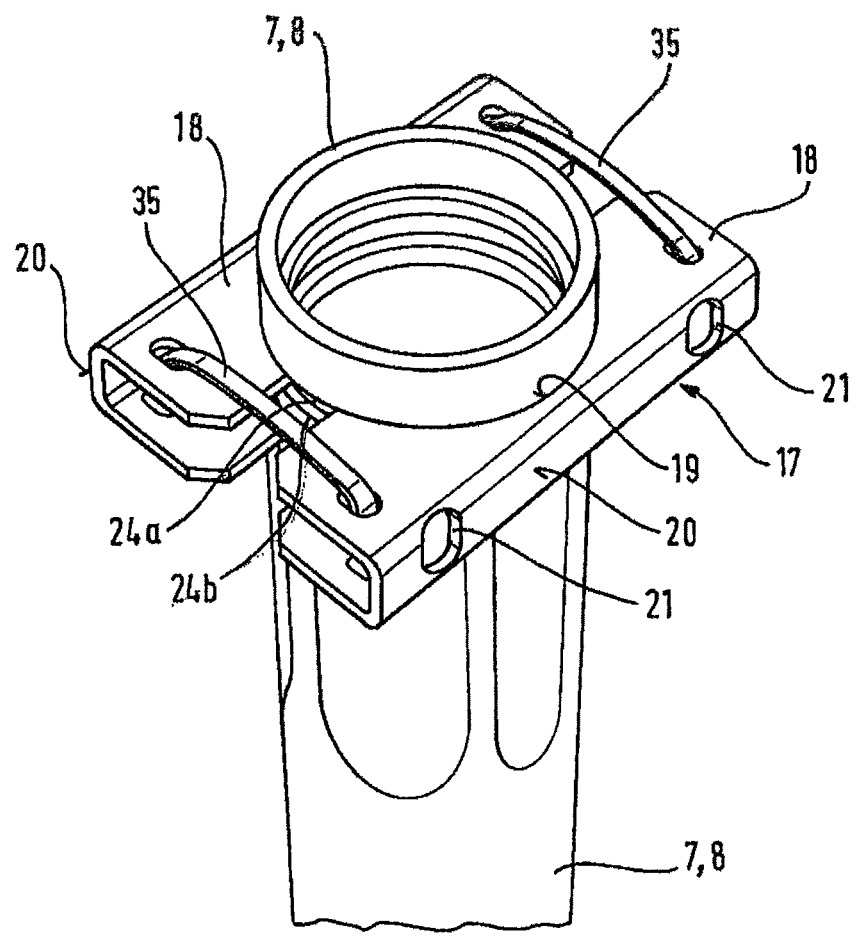

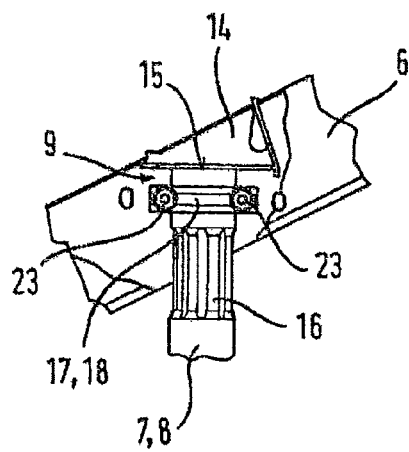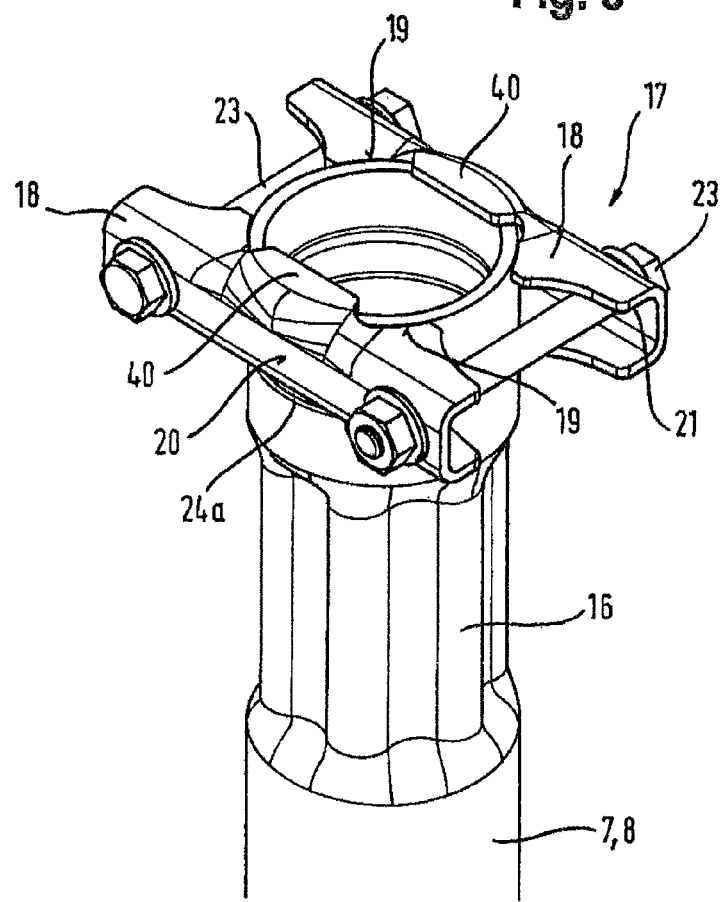

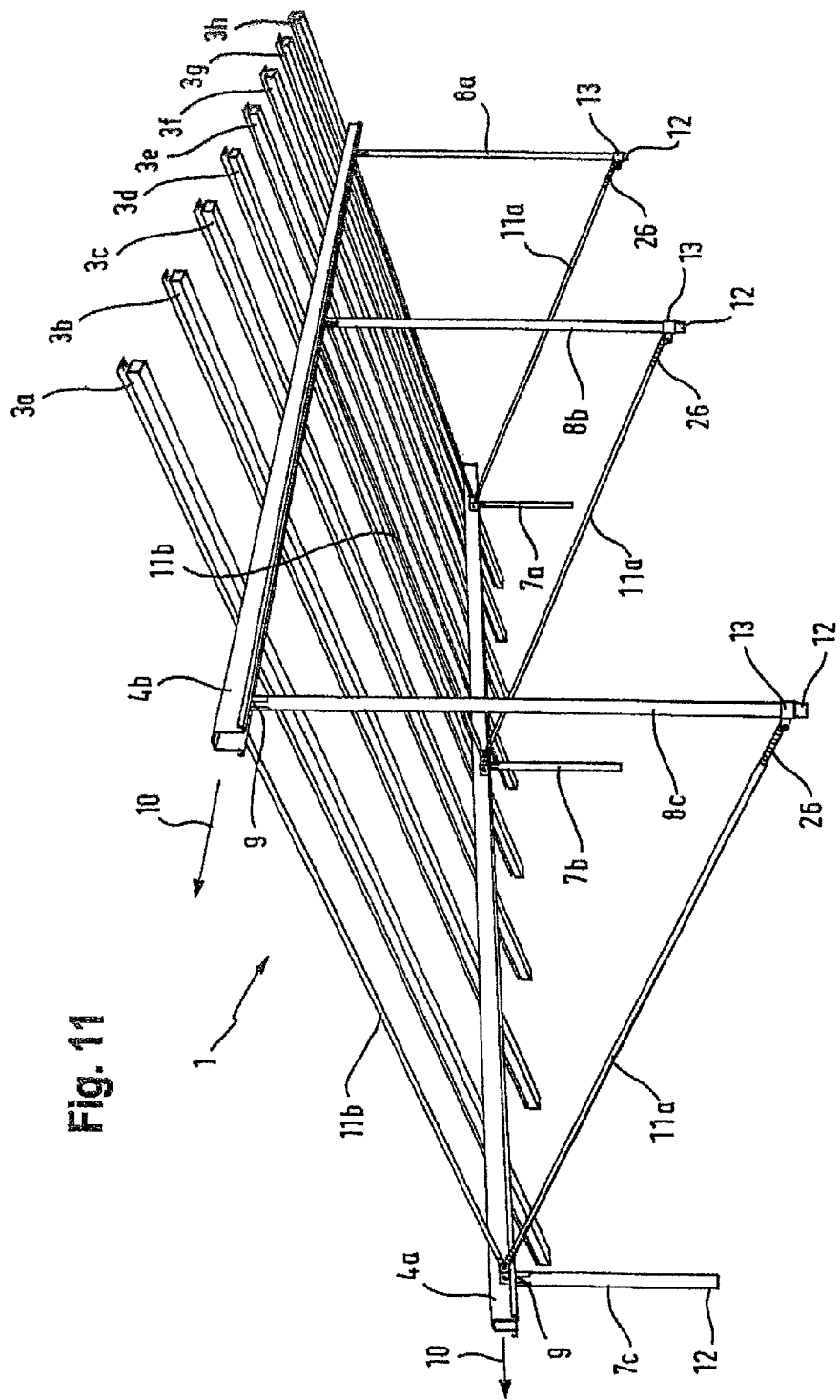

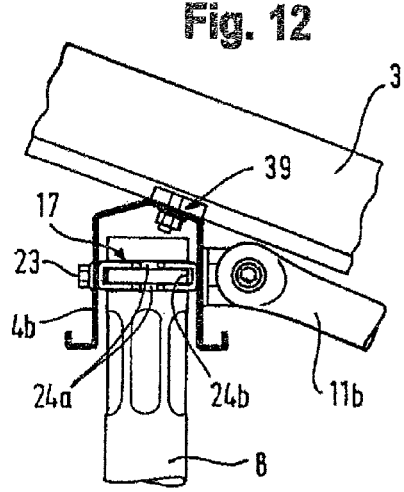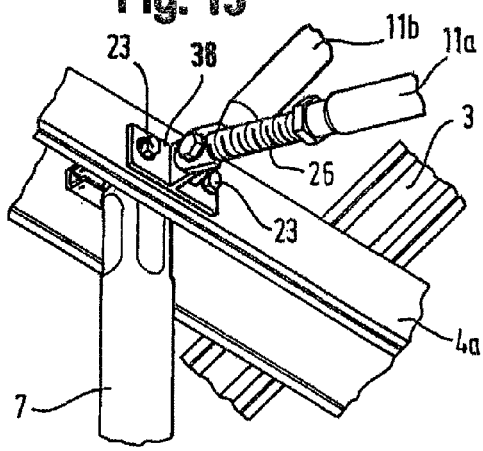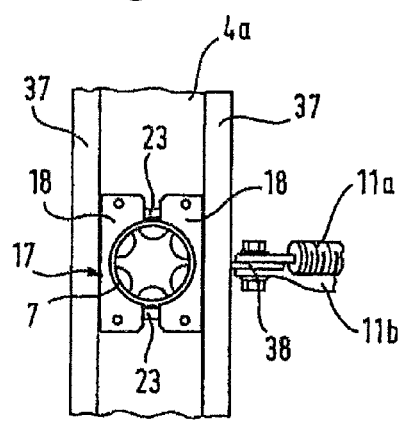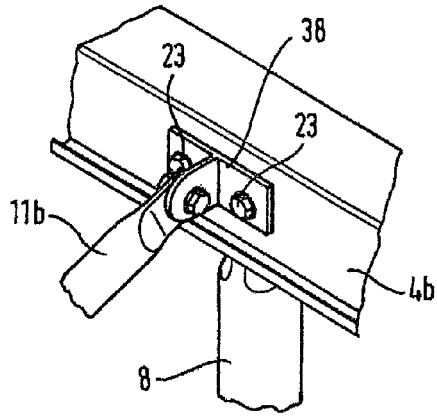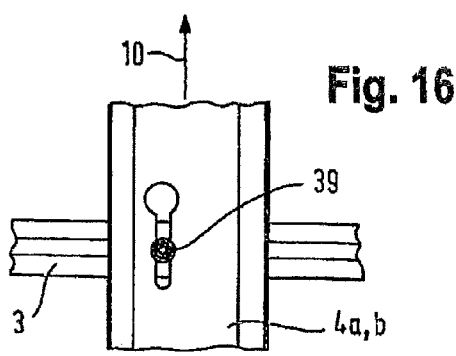

ERECTION SYSTEM FOR SOLAR PANELS

CROSS-REFERENCE TO RELATED APPLICATIONS

Priority is claimed to German Utility Model Application No. 20 201 2 005 413.9, filed Jun. 1, 2012, and German Utility Model Application No. 20 201 2 008 443.7, filed Sep. 4, 2012, the contents of each of which are incorporated herein by reference in their entirety.

BACKGROUND

It is known, for the exploitation of solar energy, to arrange a multiplicity of solar panels, in particular, for example, photovoltaic panels, areally adjacent to one another in one or in multiple long rows adjacent to and/or also above one another. To ensure optimum solar irradiation, it is important here for the panels or the surface formed from the panels to be aligned toward the sun in such a way that the greatest possible exposure to light is ensured over the greatest possible part of the day. The panels or the panel rows are therefore installed fixedly with the most expedient possible inclination toward the sun (if, for economic reasons, no provision is made for tracking the sun during the course of the day, such as is likewise known).

If the surface on which the panels are to be installed already predefines a corresponding inclination, such as is often the case for example with roofs, the panels are mounted on the predefined surface, in particular on transverse or longitudinal members, in a row adjacent to one another, if appropriate also in multiple rows one above the other. By contrast, if the predefined surface does not predefine a suitable angle with respect to the sun but rather is horizontal, such as in the case of installation on the ground, the panels or the panel surfaces must be erected such that they assume the desired angle with respect to the sun.

In practice, this is achieved by virtue of the holding members on which the one row or the multiple rows of panels arranged areally adjacent to one another are held being mounted on base members, which are arranged orthogonally with respect to said holding members, of corresponding length, which base members in turn are mounted on the ground via in each case one row of relatively short and one row of relatively long posts in such a way that said base members, and with them the panel rows mounted thereon, are inclined with their surface at the desired angle with respect to the sun. In this way, it is possible for example for entire fields to be populated with such single-row or multi-row panel groups.

For the erection of the panels, there are substantially two different types of construction. Firstly, longitudinal members as so-called base members are fastened in each case to the relatively short and relatively long posts. The inclined transverse members are arranged on said base members, to which transverse members the panels are fastened and which transverse members are therefore also referred to in this case as holding members. Secondly, transverse members as base members are fastened to in each case one short and one long post, to which transverse members the longitudinal members are in turn fastened. The panels are fastened to the longitudinal members, such that said longitudinal members are referred to here as holding members.

In order to be able to operate economically despite the multiplicity of posts required in the case of long panel rows or relatively large fields of panels erected in this way, it is possible, for the anchoring of the posts in the ground, to provide for example conventional screw foundations, or the posts themselves may be formed as screw foundations of said type with a corresponding above-ground elongation.

Such erection arrangements have been in use for a long time in a wide variety of embodiments and have been proven to a greater or lesser extent in one or any other form. They have however also—depending on their type of construction—often exhibited very different disadvantages, it being the intention of the present application to overcome these.

For example, many of the known erection arrangements are too complicated, designed to use too much material, and thus simultaneously too heavy and too expensive. Their construction is in particular too complex and awkward for the often difficult conditions in the terrain, for example also in winter and in the case of ice and snow, and has too great a personnel requirement, which likewise entails an undesired increase in expense.

The materials used, such as for example light metals, are also often too expensive. Furthermore, specific problems are often posed in particular by the necessary alignment of the panel rows, which is important not only for aesthetic reasons and thus for the acceptance of such plants by the public but rather also in order to ensure a harmonious dissipation of the occurring forces, which are generated not only by the plant's own weight but in particular also by wind forces and snow loads.

This yields the object of proposing an erection system/foundation system for solar panels which is of the simplest possible construction, which requires as little material as possible, said material at the same time being as cheap as possible, which is as lightweight as possible and which is easy to handle, that is to say in particular to construct, inter alia with the least possible personnel requirement, and which, here, can withstand the occurring loads in as stable a manner as possible.

In order that simple mounting of the holding members of the panel and of the panels in the intended grid is ensured, that the weight of the mounted panel surfaces can be dissipated or transferred as uniformly as possible to the posts, and that the panel rows or surfaces simultaneously have an appealing appearance, that is to say for example run rectilinearly, it is necessary firstly for the base members arranged on the posts to be aligned or capable of being aligned relatively precisely with the desired nominal profile of the panel rows or of the holding members that support said panel rows, that is to say said base members must, in the installed state, be aligned with one another or run as far as possible linearly and simultaneously parallel to one another.

This could be readily ensured if the rows of posts on which the base members are mounted could themselves be reliably introduced into the ground in an aligned manner in such a way as to be aligned in the direction of the longitudinal members. This is however not the case because, in particular during the screwing-in of screw foundations, disturbances repeatedly arise in the screwing-in process, for example owing to rocks which are situated in the way and which deflect the screw foundation penetrating into the ground out of its direction, with the result of an oblique position of the post.

Said oblique position of the posts can be accepted if it runs in the direction of the longitudinal direction of the longitudinal members. This is because the transverse members or the posts can be fixed to any point of the longitudinal members, and the change in height of a post, and thus in the height of the base member mounted thereon in said region, caused by a change in direction of said post is negligibly small.

By contrast, a deflection of the posts in the longitudinal direction of the transverse members owing to the inclination thereof has a very considerable effect on the height position of the respective transverse member, and therefore requires correction.

The posts may be designed differently in cross section. If they are formed as ground screws, that is to say are screwed into the ground, they typically have a circular cross section and an engagement portion, formed for example as a polygon, hexagon or Torx, for a screwing-in tool.

If, for example, as is conventional, the base members are in the form of a downwardly open rectangular profile or else in the form of a downwardly open U-profile, the problem arises as to how as stable as possible a fastening can be realised between the substantially circular post ends remote from the ground and the planar free sides of the base members.

Furthermore, bores in the post for the purpose of fastening the latter to the base member, for example for a fastening by means of stud bolts, are rejected because the final radial position of the screwed-in posts cannot be predicted, and thus the alignment of corresponding bores with corresponding bores in the base member cannot be ensured in the case of the screwed-in posts.

This gives rise to the object of creating a simple, stable and inexpensive connection between post and base member, which eliminates the stated difficulties.

GENERAL DESCRIPTION

For this purpose, there is proposed a mounting unit by means of which the base member can be connected to the posts in a simple and stable manner. The mounting unit is composed for example of two clamping shells with in each case one semicircular recess by means of which they can be fixed in a frictionally locking and/or positively locking manner to the post, and with in each case one substantially planar abutment surface, which is situated opposite the semi-circular recess, for abutment against the substantially planar inner surface of the free sides of the for example rectangular or U-shaped transverse member.

The clamping shells are dimensioned such that they can be inserted, by way of the post held between them, into the downwardly open rectangular profile or U-profile, and such that their substantially planar abutment surfaces then abut areally against the planar inner surfaces of the free side parts of the rectangular profile or U-profile of the base member.

At their ends, the clamping shells have bores for a screw fastening by means of stud bolts. The free side parts of the base member each have corresponding bores in the region thereof intended for support on the posts. If the bores of the clamping shells are placed in overlap (in alignment) with one another and with the bores in the free sides of the base member during the alignment, stud bolts can be passed through said bores and screwed such that a fixed connection is formed between the post, the clamping shells surrounding it and the base member.

With regard to the erection of arrangement, it is possible, as already stated above, to make a distinction between two different embodiments: the embodiments with the base members as transverse or as longitudinal members.

Base members as transverse members

In order that, during the alignment, the transverse member can be displaced as required into different positions and fixed to the posts there, there is provided on the free sides of the transverse member, in the region thereof intended for support on the posts, in each case (instead of a slot which could impair stability) a multiplicity of corresponding bores, that is to say a multiplicity of bores which, in terms of their pattern, correspond in each case in a paired fashion to the pattern of the bores on the clamping shells. If the displacement takes place in a horizontal direction with the aid of mounting aids with a horizontal support and sliding surface, that is to say without a change in height of the transverse members, the multiple bores are also each arranged correspondingly, that is to say such that they are situated adjacent one another in the plane when the transverse member is mounted on the posts.

Base members as longitudinal members

In order, in the event of directional deviations of the posts in the longitudinal direction of their row or in the longitudinal direction of the longitudinal member, to attain an alignment of the bores in the clamping shells and in the longitudinal member without further deformation of the posts, the number of corresponding bores in the planar side surfaces of the longitudinal members can be increased, such that, during the placement and mounting of the longitudinal member, the matching bores can be selectively placed in alignment with one another and used for passing through the stud bolts for mounting.

In both embodiments, the multiple bores in the free legs of the base member may be designed as slots to a certain degree, for example by 1½ times to 2 times their diameter, in each case transversely with respect to the horizontal alignment of the hole sequence. In this way, it is possible for the base members to be tilted in terms of their longitudinal direction with respect to the posts to a certain degree before being fixed to the posts. In this way, a certain degree of freedom is created during the mounting process, which can be utilized for example in order to adapt the structure, that is to say the transverse and longitudinal members, in terms of their height to relatively small gradients and slopes in the terrain. It has been found that, in this way, a terrain slope of up to 3% can be compensated in a simple manner. It is likewise possible in this way for certain (very slight) shortenings of the post height, resulting from incorrect positioning of the posts, specifically the deviation thereof from the vertical in the direction of their post row or of the members, to be compensated.

To facilitate said compensation, those abutment surfaces of the clamping shells which are situated opposite the semi-circular recess of the clamping shells may also, instead of being substantially planar, be curved slightly such that they generate less resistance for corresponding compensation movements between transverse member and post.

During the tightening of the stud bolts, an at least frictionally locking connection is produced between the clamping jaws or clamping shells and the post, and also between the clamping shells and the base member. If this is considered not to be secure enough, it is possible if appropriate for one or more annular beads or annular grooves to be provided on the post, it being possible for the clamping shells or corresponding grooves or beads thereon to be placed in positively locking abutment with said annular beads or annular grooves.

To facilitate the on-site mounting of the clamping shells, these may be held available so as to be connected in each case in pairs by means of a mounting aid, in such a way that they can be plugged onto the post end so as to be provisionally held for mounting.

The mounting aid may in the simplest case be composed of an elastic element, for example an elastic band, which holds the clamping shells together and, as a result of the expansion thereof, allows the clamping shells to be moved apart, whereby the circular opening formed by the semi-circular recesses of the clamping shells is widened such that the clamping shells can be plugged over that region of the post which is remote from the ground, and provisionally fixed there in a clamping manner for the further mounting process.

Instead of an elastic band, it is also possible for other elastic elements to be used as a mounting aid.

Another design according to the present disclosure of the mounting aid provides that each clamping shell has, on one end region thereof, a quick-action clamping device, and on the opposite end region thereof, an engagement means for the corresponding quick-action clamping device of another clamping shell, in such a way that two clamping shells can, by means of their two quick-action clamping devices, be provisionally fixed to one another in a simple manner on that region of the post which is remote from the ground.

Particularly simple mounting is possible if—as is also proposed according to the present disclosure—a bracket part is provided to which the respective transverse strut and the respective diagonal strut can be jointly fixed at their end facing toward the relatively short post and which is also extended through by the stud bolts such that the ends of the struts can be fixed to the first longitudinal member and to the relatively short post in one working step by means of the stud bolts and the mounting unit.

As longitudinal members, use is often made of aluminium profiles; these have desired material characteristics but are expensive. Since they are required in large unit quantities, they account for a very considerable part of the overall costs.

The members are preferably formed as cold-worked, zinc-plated steel profiles which, to improve their stiffness, have outward or inward bends at the free ends of their planar free side surfaces.

BRIEF DESCRIPTION OF THE DRAWINGS

The erection system/support according to the present disclosure will now be described in more detail on the basis of exemplary embodiments shown in the drawings, in which:

FIG. 1 shows a first embodiment of the erection system according to the present disclosure in a side view;

FIG. 2 shows a post 7, 8 having a first embodiment of a mounting unit 17 according to the present disclosure;

FIG. 3 shows a second embodiment of a mounting unit 17 according to the present disclosure on the post 7, 8;

FIG. 6 shows the articulation region 9 of a transverse member with a post 7, 8 articulated thereon and with an insert 14 according to the present disclosure and mounting unit 17;

FIG. 11 shows the erection system 1 according to the present disclosure as per FIG. 10 in another perspective illustration;

FIG. 12 shows, as a detail, the connection of the second longitudinal member 4b, transverse member 3, transverse strut 11a and relatively long post 8 in a side view;

FIG. 13 shows, as a detail, the connection of the first longitudinal member 4a, transverse member 3, transverse strut 11a, diagonal strut 11b and relatively short post 7 in a perspective illustration;

FIG. 14 shows, as a detail, a plan view of the underside of a longitudinal member 4a, b with mounting unit 7 positioned therein;

FIG. 15 shows, as a detail, the connection of a second longitudinal member 6 to a relatively long post 8 and a transverse strut 11a; and FIG. 16 shows, as a detail, the connection of a transverse member 3 to a longitudinal member 4a, b.

DETAILED DESCRIPTION

Figure 4:
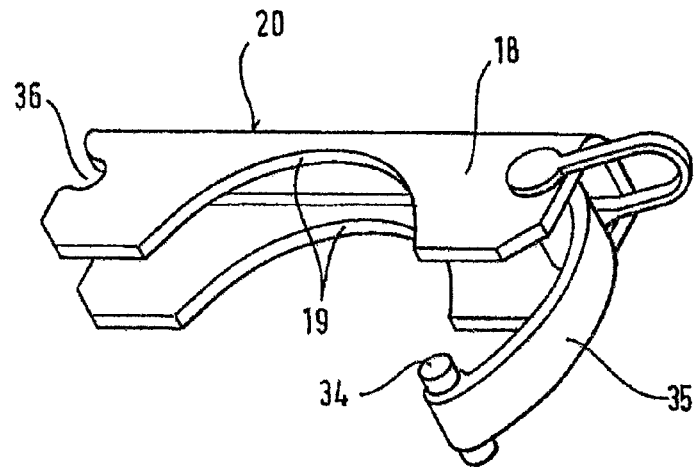
FIG. 4 shows a clamping shell 18 as a part of another mounting unit 17 according to the present disclosure.

FIG. 1 shows a first embodiment of the erection system 1 according to the present disclosure for solar panels 2 in a side view. The figure shows a relatively short and a relatively long post 7, 8, which posts are anchored in the ground—for example by means of a ground screw (not illustrated) formed thereon—and project substantially vertically out of the ground. A transverse member 6 as base member is mounted on the posts 7, 8 and, in each case in its articulation regions 9, connected by means of a mounting unit 17 to the upper end of the relatively short and of the relatively long post 7, 8. Owing to the different lengths of the two posts 7, 8, the transverse member is inclined by an angle α. For stiffening, a transverse strut 11a is provided, said transverse strut being connected at a first end to the transverse member 6 in the region of its articulation 9 to the relatively short post 7. The second end of the transverse strut 11a is, by means of a sliding and fixing device 13, connected in a slidingly movable and fixable manner to the end 12, close to the ground, of the relatively long post 8.

For the mounting of one or more rows of solar panels 3, 4, the erection arrangement shown is arranged on the ground in a repeating manner in imaginary planes parallel to the drawing plane. Longitudinal members 5a to d as holding members are fastened, spaced apart from one another and substantially orthogonally with respect to the transverse members 6, to the transverse members 6 which run parallel to one another. The present FIG. 1 indicates, by way of example, two rows of panels arranged one above the other. A first row 3 of solar panels 2 is arranged on the longitudinal members 5a and b, and a second row of solar panels 4 is arranged on the longitudinal members 5c and d. This yields a two-row arrangement of solar panels 2, wherein the two rows 3, 4 may be of any desired length. Accordingly, an areal arrangement of the solar panels 2 is provided which is inclined toward the sun.

The transverse members 6 are normally aligned in a North-South direction, and accordingly, the longitudinal members 5a to d run in an East-West direction. The angle of inclination α of the transverse members 6 is, at Central European latitudes, approximately 25°+/−5° in order to attain an optimum solar irradiation angle.

For the construction of the erection system 1 according to the present disclosure, the relatively short and relatively long posts 7, 8 are placed in each case in rows. Here, the posts are screwed in to such an extent that their upper end is situated at a predetermined height. Here, the height of the posts 7 can be set very precisely, by contrast to the lateral alignment of said posts. A transverse member 6 is mounted on the upper end of in each case one short and one long post 7, 8. The transverse member is for example in the form of an open, substantially rectangular or U-shaped profile with planar free side surfaces 27. The profile is composed of zinc-plated sheet metal and can be produced from steel sheet by cold working.

The transverse member 6 is mounted, together with the transverse strut 11a, on the posts 7, 8. In order that, during the mounting, the transverse member 6 does not slip downward under the force of gravity, and in order to be able to displace said transverse member without a change in height in its longitudinal direction 10, inserts 14 as a mounting aid are provided in the articulation regions 9 of said transverse member, where the transverse member 6 rests on the upper ends of the posts 7, 8. Said mounting aids form in each case one rest and sliding surface 15, by way of which the transverse member 6 rests on the ends of the posts 7, 8 during mounting. The inserts 14 are designed such that their rest and sliding surface 15 are aligned substantially horizontally when the transverse member 6 has been placed onto the posts 7, 8. For this purpose, the inserts 14, which form a mounting wedge, have for example the shape of a wedge, one long flank of which forms the horizontal rest and sliding surface 15.

The mounting wedge 14 may be formed from plastic and designed to merely be clipped by means of detent lugs into openings of the transverse member 6. The mounting wedge need no longer absorb any forces after the final assembly of the foundation system 1, such that said mounting wedge need be dimensioned merely for the loads that occur during the mounting of the transverse member 6. Said mounting wedge may thereafter remain in place or be removed for example for reuse, or may also be destroyed during the course of further mounting.

FIG. 2 shows a post 7, 8 with an annular groove 24a or annular bead 24b and with a mounting unit 17 according to the present disclosure pre-mounted thereon. The base member 4, 6, in this case the transverse member 6, is connected to the post 7, 8 by means of the mounting unit 17.

The mounting unit 17 is composed of two clamping shells 18 which have semi-circular recesses 19, by way of which they abut against the posts 7, 8 during the mounting process.

The clamping shells 18 have substantially planar abutment surfaces 20 by way of which, after they are introduced into the profile of a base member 6, they can abut against the planar free side surfaces of said profile.

The clamping shells 18 also have bores 21 which, during the mounting process, are placed in alignment with corresponding bores 22 in the planar free side surfaces of the longitudinal members 4a, b in such a way that stud bolts 23 (not illustrated in FIG. 2) for fixing the base member 6 to the posts 7, 8 can be passed through and tightened.

To facilitate the mounting process, two clamping shells 18 are combined by means of a mounting aid 35 to form a mounting unit 17. The mounting aid 35 is composed in this case of two elastic elements, by the expansion of which the clamping shells 18 can be pulled apart to such an extent that they can be plugged over the end 9, remote from the ground, of the post 7, 8 and held (provisionally) in position there for the final mounting process by the force of the elasticity of the mounting aid.

FIG. 3 shows the upper end of a post 7, 8 with an engagement portion 16 for a screwing-in tool and with an annular groove 24a or annular bead 24b for improving the purchase of an alternative design of the mounting unit 17.

Here, the mounting unit 17 has been placed onto the upper end of the post and is in the mounted position. Said mounting unit is composed of two clamping shells 18 and two stud bolts 23 which fixedly clamp the clamping shells to the post 7, 8. To ensure good abutment of the clamping shells 18 against the post 7, 8, the clamping shells 18 have semi-circular recesses 19 on their side facing toward the post 7, 8.

To ensure good abutment of the clamping shells against the planar surfaces 27 of the free sides of the profile of the transverse member 6, the abutment surfaces 20 by way of which the clamping shells 18 in the profile of the transverse member 6 abut against the planar free side 27 of said profile are likewise of planar form. Said abutment surfaces have at least a planar region.

Said abutment surfaces may also have rounded longitudinal edges (at the outside on the clamping shells) as indicated in FIG. 3. This facilitates the tilting of the base member 6 about its longitudinal axis 10 for the purpose of compensating changes in terrain height and for compensating oblique positions of the posts 7, 8, as has been described in the introduction in conjunction with the formation of the bores 22 in the transverse member 6 as slots.

As must be clarified here owing to the different illustration in this figure, the stud bolts 23 serve not only for connecting the mounting unit 17 to the post 7, 8. In fact, in a way which is not shown here, the stud bolts are passed through the bores 22 in the base member 6 and through the bores in the clamping shells 18 of the mounting unit 17 which has been positioned in the transverse member profile, such that a fixed connection between all of said parts is produced when the stud bolts 23 are tightened.

If the frictional locking hereby generated between the mounting unit 17 and the post 7, 8 is not sufficient to reliably dissipate vertical forces, at least one annular groove 24a or one annular bead 24b is provided on the post 7, 8, with which annular groove or annular bead the mounting unit 17 engages with a positively locking action. Corresponding means for positive locking may self-evidently also be provided on the mounting unit, for example projections 40, likewise shown in the figure, which rest on the upper edge of the post.

For the pre-mounting of the mounting unit 18 on the post 7, 8, it is possible for in each case two clamping shells 18 to be connected to one another by means of a mounting aid 35—not shown—such that said clamping shells (without the stud bolts 23) can, for the insertion of the unit composed of mounting unit 17 and post 7, 8 into the transverse member profile 6, be pre-mounted onto the post 7, 8. This is of significance because the stud bolts 23, since they must be passed through the two clamping shells 18 and the bores in the transverse member 6, can be passed through the bores 21 and fixed, in order thereby to connect the transverse member 6 to the post 7, 8 by means of the clamping shells 18, only after the alignment of the transverse member 6 placed onto the post 7, 8.

FIG. 4 shows a differently designed clamping shell 18 as part of a different mounting unit 17 according to the present disclosure.

The clamping shell 18 has likewise semi-circular recesses 19 for abutment against the post 7, 8 and substantially planar abutment surfaces 20 for abutment against the planar free side surfaces of the base members 4, 6 and bores 21 (not shown here) for stud bolts 23 (likewise not illustrated).

The mounting aid 35 is in this case a quick-action clamping device 35 which is provided on one end region of a clamping shell 18, whereas, on the other end region of the clamping shell 18, there is provided an engagement portion 36 for a corresponding quick-action clamping device 35 of another, correspondingly designed clamping shell.

Figure 5:
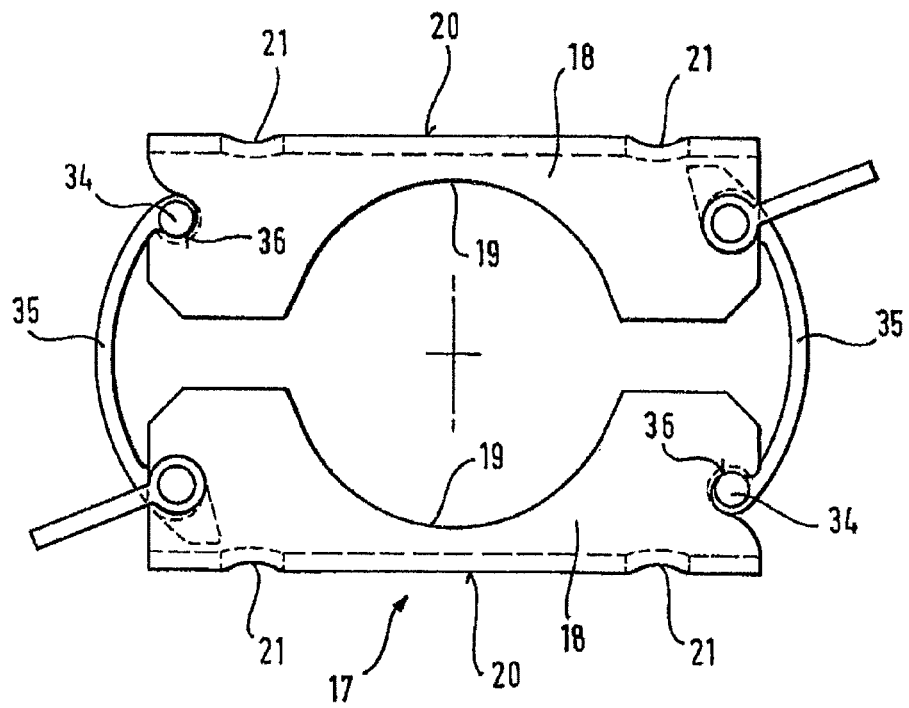
FIG. 5 shows two clamping shells 18 as per FIG. 4 which have been connected to form a mounting unit 17 according to the present disclosure.

FIG. 5 shows how two (identical) clamping shells 18 designed in this way, illustrated in this case with bores 21, are connected to one another as a mounting unit 17 according to the present disclosure by being placed with their recesses 19 around the post and each of the two quick-action clamping devices 35 thereof having a bolt 34 being fixed to the engagement portion 36 of the respective other clamping shell 18.

FIG. 6 shows, as a detail, an articulation region 9 between a post 7, 8 and a transverse member 6, having an insert 14 according to the present disclosure as a mounting aid with a horizontal rest and sliding surface 15, having the engagement portion 16 for a screwing-in tool for screwing the post 7, 8 in, and having the mounting unit 17 for fastening the transverse member 6 to the post 7, 8. The figure shows a clamping shell 18 facing toward the viewer, and two stud bolts 23 for fixing the connection.

Figure 7A:
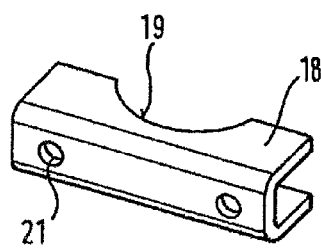
FIG. 7a shows the first embodiment of a clamping shell 18 according to the present disclosure.

FIG. 7a shows the first embodiment of a clamping shell 18 according to the present disclosure. The clamping shell 18 is of U-shaped cross section, and the end regions of the two free legs of the U-profile form two projections which constitute the regions of abutment of the clamping shell 18 against the post 7, 8 and which have the semi-circular recess 19.

Figure 7B:
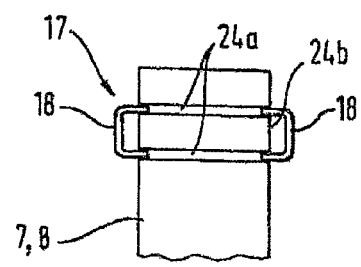
FIG. 7b shows the first embodiment of a mounting unit 17 according to the present disclosure.

FIG. 7b shows the first embodiment of a mounting unit 17 according to the present disclosure on a post 7, 8, wherein the mounting unit 17 is formed from the clamping shells 18 shown in FIG. 7a with two abutment regions, which in this case engage into two grooves 24a on the post 7, 8 and thus produce a positively locking connection between the post 7, 8 and mounting device 18.

Figure 8A:
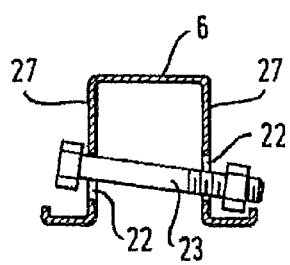
FIG. 8a shows a cross section through a transverse member 6 according to the present disclosure in one of its articulation regions 9 on the posts 7, 8 (not shown)
Figure 8B:
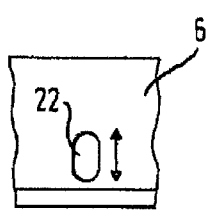
FIG. 8b shows a bore 22 on the transverse member 6 as a slot.

FIG. 8a shows a cross section through a transverse member 6 according to the present disclosure in one of its articulation regions 9 on the post 7, 8 (not shown). Also shown is a stud bolt 23 which extends through the bores 22 in the transverse member 6. The transverse member 6 is inclined in relation to the stud bolt 23, whereby it is indicated that the transverse member 6 is tilted about its longitudinal axis 10 relative to the post 7, 8 (not shown). This means that the bores 22 in the transverse member 6 and also the widening thereof with respect to the stud bolt 23 can be deduced, and are, as shown separately in FIG. 8b, formed as slots which are aligned vertically in the installed state of the transverse member 6.

Figure 8C:
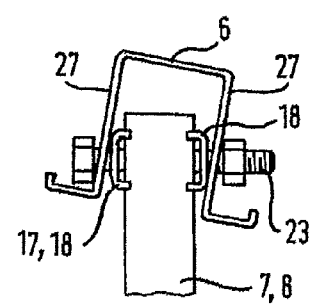
FIG. 8c shows a further sectional illustration of a transverse member 6 in one of its articulation regions 9 on the posts 7, 8, with mounting unit 17.

FIG. 8c shows, in a further sectional illustration, a cross section through a transverse member 6 in one of its articulation regions 9 on a post 7, 8. The post 7, 8 is mounted, with the mounting unit 17 composed of two clamping shells 18 and stud bolts 23, on the transverse member 6. Here, the transverse member 6 is fixedly screwed having been tilted about its longitudinal axis 10 relative to the post 7, 8, which is permitted primarily by the stated design of the bores 22 in the transverse member 6 as slots.

It can however additionally be seen from the drawing that the abutment surfaces 20 of the clamping shells 18, by way of which abutment surfaces said clamping shells abut against the planar inner surfaces of the free side surfaces 36 of the transverse member 6, are of rounded design at their longitudinal edges, which further facilitates tilting of the transverse member 6 relative to the post 7, 8 for compensation of terrain slopes or oblique positions of the posts 7, 8 in an East-West direction.

Figure 9:
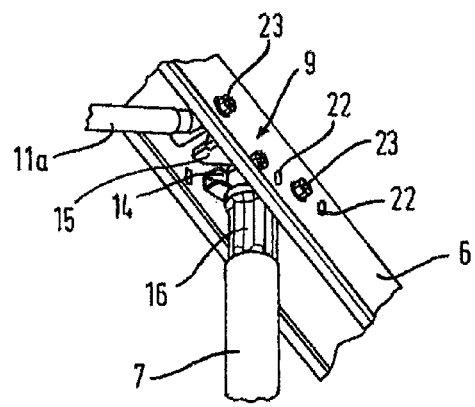
FIG. 9 shows a three-dimensional illustration of the connection between post 7 and transverse member 6.

FIG. 9 shows, as a detail, the upper part of a relatively short post 7 with the engagement portion 16 for a screwing-in tool, the transverse-member-side end of the transverse strut 11a, and the transverse member 6, fastened to the post 7 and to the transverse strut 11a, in the region 9 of its articulation on the relatively short post 7. It is also possible to see the insert 14 with its horizontal rest and sliding surface 15. The mounting unit 17 is indicated merely by the associated stud bolt 23 which extends through the bore holes 22.

On the transverse member 6, five slots 22 are indicated on each side of the profile. The slots 22 are, in the installed state of the transverse member 6, arranged substantially horizontally adjacent one another, that is to say at one level. In this way, the transverse member 6 can, after the alignment which has been described in more detail in conjunction with FIGS. 2 and 4, be fixed in various positions on the post 7, 8. The slots 22 have the advantage that the described tilting is possible between the transverse member 6 and post 7, 8. The fact that a slot in the longitudinal direction 10 of the transverse member is not provided instead of the individual bores 22 is because such a slot could impair the stability in said region.

During the mounting process, the transverse member 6 is initially aligned, by displacement on the relatively short post 7, with the other transverse members 6. Here, the transverse strut 11a may be used for assistance, and the alignment may be effected by displacement of the sliding and fixing device 13 thereof downward or upward. The transverse strut 11a is then fixed by means of the sliding and fixing device 13, and the transverse member 6 is fixed to the relatively short post by screw connection by means of the mounting unit 17. Subsequently, the transverse member 6 is connected to the relatively long post 8 by means of a corresponding mounting unit 17. Here, the upper end of the relatively long post 8 can, owing to its length and resulting flexibility, be forced into a position in which the bores 22 are aligned with the bores 21 of the clamping shells 18, such that the stud bolts 23 can be passed through in order to be fixedly screwed.

As shown in FIG. 9, the insert 14 may if appropriate remain on the transverse member 6 after the connection of the transverse member 6 to the posts 7, 8.

Figure 10:
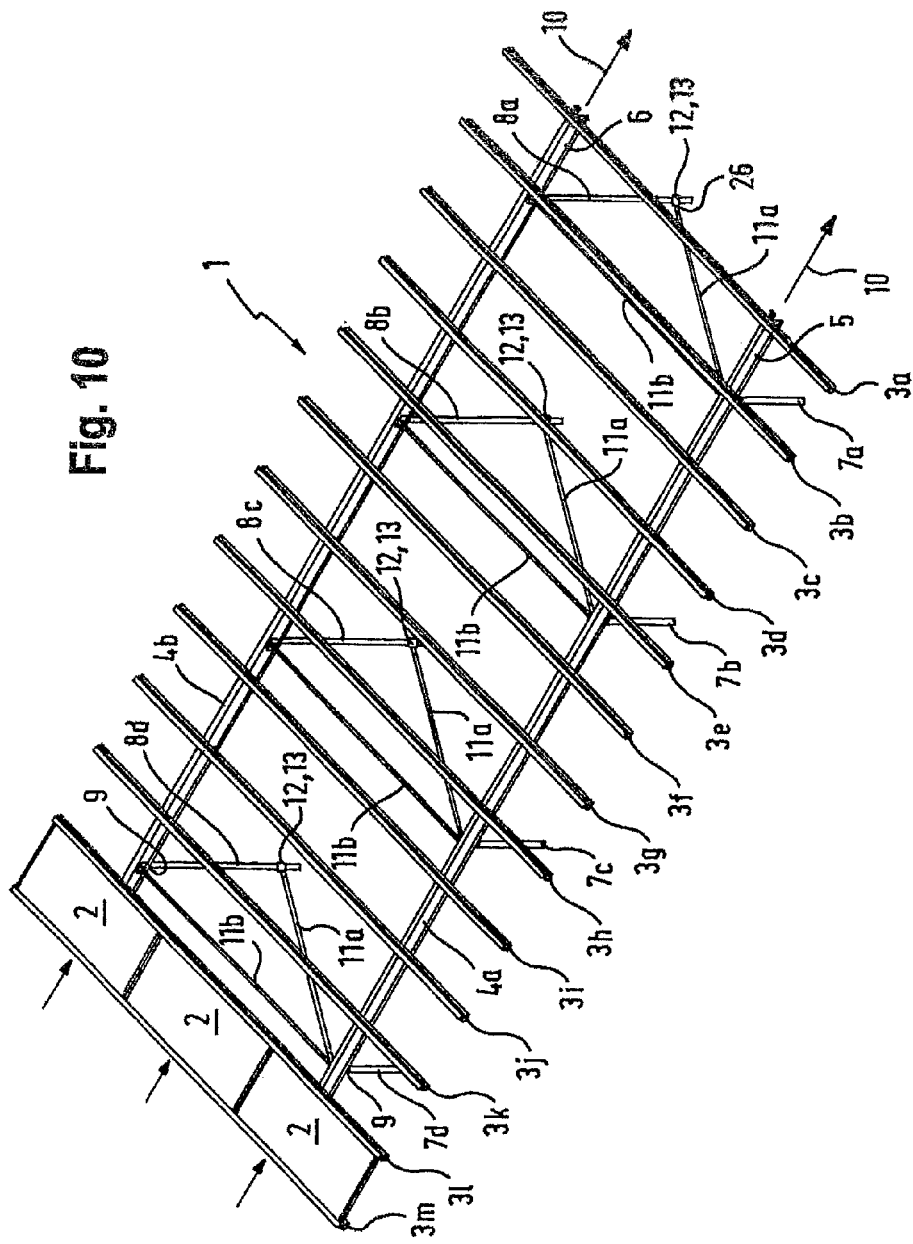
FIG. 10 shows a second embodiment of the erection system 1 according to the present disclosure in a perspective illustration.

FIG. 10 shows a second embodiment of the erection system 1 according to the present disclosure for solar panels 2 in a perspective illustration. The figure shows relatively short posts 7a-d and relatively long posts 8a-d, said posts being anchored in the ground—for example by means of a ground screw (not illustrated) formed thereon—and project substantially vertically out of the ground.

The region 9, remote from the ground, of each relatively short post 7a-d is connected by means of a transverse strut 11a to that region 9, remote from the ground, of the respectively oppositely situated relatively long post 8a-d.

An adjustable diagonal strut 11b is provided between the region 12, close to the ground, of each relatively long post 8a-d and the region 9, remote from the ground, of each relatively short one 7a-d of the posts 7a-d, 8a-d connected by means of the transverse strut 11a.

The diagonal strut 11b can be adjusted and fixed in terms of its length by means of a screw thread 26 or is slidingly and fixably guided on the end 12, close to the ground, of the relatively long post 8 by means of a sliding and fixing device 13, such that as a result of the adjustment thereof, the respective relatively short post 7a-d can be corrected in terms of its alignment with the post row 7a-d or with the longitudinal direction 10 of the longitudinal member 5, which—owing to the rigid connection of the relatively short post 7a-d to the relatively long posts 8a-d by means of the respective transverse strut 11a, simultaneously leads to a correction of the position of the region 9, remote from the ground, of the respective relatively long post 8a-d.

A first base member formed as a longitudinal member 4a is fixed to the relatively short post 7a-d, and a second base member formed as a longitudinal member 4b is fixed to the relatively long posts 8a-d. To the longitudinal members 4a, b there are fixed, at right angles thereto, transverse members 3a-m, by means of which one or more rows of solar panels 2 are held, wherein the rows, and with them the longitudinal members 4a, b, may be of any desired length.

Owing to the different lengths of the first posts 7a-d and of the second posts 8a-d, the transverse members 3a-m and with them the panel surfaces are inclined so as to be aligned toward the sun. The angle of inclination of the transverse members 3 and with them the panel surfaces is, at central European latitudes, approximately 15-30° in order to attain an optimum solar irradiation angle.

For the construction of the erection system 1 according to the present disclosure, the relatively short and relatively long posts 7, 8 are placed in each case in rows. Here, the posts are screwed in to such an extent that their upper end is situated at a predetermined height. Here, the height of the posts 7, 8 can be set very precisely, by contrast to the lateral alignment of said posts. In each case one longitudinal member 4a, b is mounted on the upper end of in each case one row of short and one row of long posts 7, 8. The longitudinal member 4a, b is for example in the form of a downwardly open, substantially rectangular or U-shaped profile with planar free side surfaces. The profile may be produced from zinc-plated, for example cold-worked sheet metal.

FIG. 11 shows the erection system 1 according to the present disclosure as per FIG. 10 in another perspective illustration.

The figure shows relatively short posts 7a-c and relatively long posts 8a-c which are anchored in the ground—for example by means of a ground screw (not illustrated) formed thereon—and which project substantially vertically out of the ground.

The region 9, remote from the ground, of each relatively short post 7a-c is connected by means of a transverse strut 11a to the region 9, remote from the ground, of the respectively oppositely situated relatively long post 8a-c. An adjustable diagonal strut 11b is provided between the region 12, close to the ground, of each relatively 8a-c long post 8a-c and the region 9, remote from the ground, of each relatively short one 7a-c of the posts 7a-c, 8a-c connected by means of a transverse strut 11a.

The diagonal strut 11b can be adjusted and fixed in terms of its length by means of a screw thread 26 and alternatively or also simultaneously slidingly and fixably guided on the end 12, close to the ground, of the relatively long post 8a-c by means of a sliding and fixing device 13, such that as a result of the displacement and/or length adjustment thereof by means of the thread, the respective relatively short post 7a-c can be corrected in terms of its alignment with the post row 7a-c or with the longitudinal direction 10 of the longitudinal member 5, which—owing to the rigid connection of the relatively short posts 7a-c to the relatively long posts 8a-c by means of the respective transverse strut 11a, simultaneously leads to a correction of the position of the region 9, remote from the ground, of the respective relatively long post 8a-c.

A first longitudinal member 5 is fixed to the relatively short posts 7a-c, and a second longitudinal member 6 is fixed to the relatively long posts 8a-c. To the longitudinal members 4a, b there are fixed, at right angles thereto, transverse members 3a-h, by means of which (not shown here) one or more rows of solar panels 2 are held, wherein the rows may be of any desired length.

The posts 7, 8 are connected to the base member 5 by means of a mounting unit 17 as per one of FIGS. 2 to 5. Here, the mounting units 17 (together with quick-action clamping devices 35) as per FIGS. 2, 3, 4 and 5 may be used regardless of whether the embodiment of the erection arrangement is one with base members as transverse members (FIG. 1) or as longitudinal members (FIG. 10, 11). The mounting devices shown in FIGS. 2, 3, 4 and 5 can therefore also be used for the second embodiment.

FIG. 12 shows, as a detail and in a side view, the connection of the second longitudinal member 4b, transverse member 3, transverse strut 11a and relatively long post 8 by means of the mounting unit 17 with stud bolts 23. Likewise illustrated is the connection 39 between the longitudinal member 4b and a transverse member 3.

FIG. 13 shows, as a detail and in a perspective illustration, the assembled connection of a first longitudinal member 4a to a transverse member 3, a transverse strut 11a, a diagonal strut 11b and a relatively short post 7. The figure shows the bracket part 38 by means of which the transverse strut 11 a and the diagonal strut 11b, the latter with a thread 26 for the length adjustment thereof, are connected by means of stud bolts 23 to the longitudinal member 4a and—via the mounting unit 17—to the post 7.

FIG. 14 shows, as a detail, a plan view of the underside of a first longitudinal member 4a with bent portions 37 in the mounted position on a relatively short post 7. It is possible to see the mounting unit 17 with clamping shells 18 and the stud bolts 23. Also shown is a bracket part 38 with transverse strut 11 a and diagonal strut 11b mounted thereon, likewise in position mounted on the longitudinal member 4a by means of the stud bolts 23 and the mounting unit 17, wherein, however, the head and nut of the stud bolts 23 are hidden by the bent portions 37 of the longitudinal member 4a.

FIG. 15 shows, as a detail, the connection of a relatively long post 8 to a second longitudinal member (4b) by means of a (hidden) mounting unit 17 with stud bolts 23 which simultaneously extend through and fix a bracket part 38 to which a transverse strut 11 a is fastened.

Additionally, FIG. 16 shows, as a detail, an exemplary connection of a transverse member 3 to a longitudinal member 4a, 4b. On the longitudinal member 4a, 4b there is provided a recess which is slot-shaped in its longitudinal direction 10, which recess has a widening at its end. Through said widening it is possible for a mounting unit—for example a screw or plug-in connection or a quick-action clamping device 39, and if appropriate pre-mounted on the transverse member 3—to be passed through for mounting. By means of the longitudinal slot, it is then possible for the transverse member 3 to be displaced on the longitudinal member 4a, 4b into the mounting position and then fixed there by means of the quick-action clamping device 39.

We claim:

1. Erection system for the attachment of solar panels, which are to be arranged areally adjacent one another, such that they are inclined toward the sun, said erection system comprising:

a multiplicity of holding members adapted to hold the solar panels in rows, wherein the holding members are fastened to posts, which are anchored in a ground, by means of base members which are arranged substantially orthogonally with respect to said holding members and which are in the form of downwardly open U-profiles, and the base members are connectable to the posts via mounting units, the mounting units having in each case two clamping shells with in each case semicircular recesses for abutment against the posts and substantially planar abutment surfaces for abutment against side surfaces of the U-profile, and bores being arranged in the abutment surfaces of the clamping shells and corresponding bores being arranged in the side surfaces of the base members such that the base members can be fixed in at least one of a frictionally locking manner and a positively locking manner to the posts by stud bolts which extend through said bores in said abutment surfaces and said corresponding bores in said side surfaces of the base members.

2. Erection system according to claim 1, wherein said posts are in the form of long posts and short posts and wherein the base members are in the form of transverse members which are inclined toward the sun and which each are connectable by means of one of the mounting units to one of the short posts and one of the mounting units to one of the long posts, and the holding members are in the form of longitudinal members.

3. Erection system according to claim 1, wherein the said base members are in the form of first and second base members, wherein said posts are in the form of long posts and short posts and wherein first first base members are arranged in each case on multiple ones of the short posts, and the second base members are arranged in each case on multiple one of the long posts, and the holding members are in the form of transverse members inclined toward the sun.

4. Erection system according to claim 1, wherein in each case a multiplicity of said corresponding bores is provided in a side surfaces of the base members, which bores extend in a longitudinal direction of the base members such that, during the alignment and fastening of the base members on the posts, selected ones of the corresponding bores are aligned with the bores in the clamping shells such that the stud bolts can be passed through.

5. Erection system according to claim 1, wherein, at that end of the posts which is remote from the ground, there is provided at least one formation comprising at least one of an annular bead and an annular groove, with which the clamping shells interact with the posts via said positively locking manner.

6. Erection system according to claim 1, wherein a mounting aid connects in each case the two clamping shells such that they can be provisionally fixed in a clamping manner to the post for mounting.

7. Erection system according to claim 6, wherein, as the mounting aid, each clamping shell has, on one end region thereof, a quick-action clamping device, and on the opposite end region thereof, an engagement means for the corresponding quick-action clamping device of another clamping shell, in such a way that the two clamping shells can, by means of the quick-action clamping devices, be fixed to that region of the posts which is remote from the ground.

8. Erection system according to claim 7, wherein each quick-action clamping device is rotatably mounted in its corresponding clamping shell, and the quick-action clamping device having a bolt that can be introduced into an engagement portion of the other one of the two clamping shells.

9. Erection system according to claim 1, wherein the bores in the planar free side surfaces of the base members are formed, transversely with respect to a longitudinal direction of the base members, as slots.

10. Erection system according to claim 9, wherein the slots have a length of approximately 1 ½ times to 2 times their width.

* * * * *

UNITED STATES PATENT AND TRADEMARK OFFICE
CERTIFICATE OF CORRECTION

| | | |
|---|---|---|
| PATENT NO. | : 9,188,366 B2 | Page 1 of 1 |
| APPLICATION NO. | : 13/907255 | |
| DATED | : November 17, 2015 | |
| INVENTOR(S) | : Günther Thurner et al. | |

It is certified that error appears in the above-identified patent and that said Letters Patent is hereby corrected as shown below:

<u>In the Claims:</u>

At Column 13, line 15, Claim 3, "wherein first" should be -- wherein the --.

At Column 13, line 17, Claim 3, "one" should be -- ones --.

At Column 13, line 22, Claim 4, "a side" should be -- the side --.

Signed and Sealed this
Seventh Day of June, 2016

Michelle K. Lee
*Director of the United States Patent and Trademark Office*